Patented Feb. 28, 1950

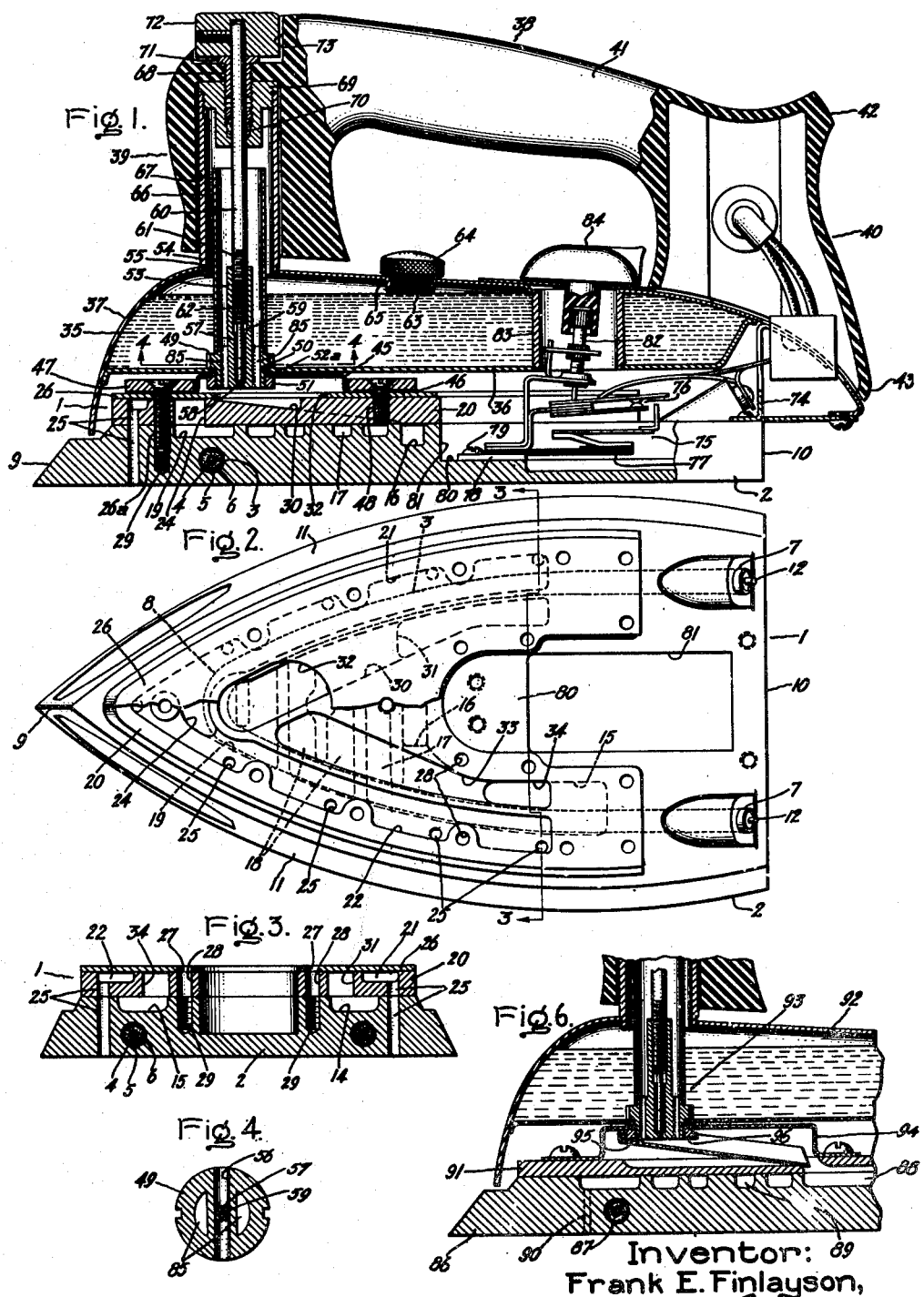

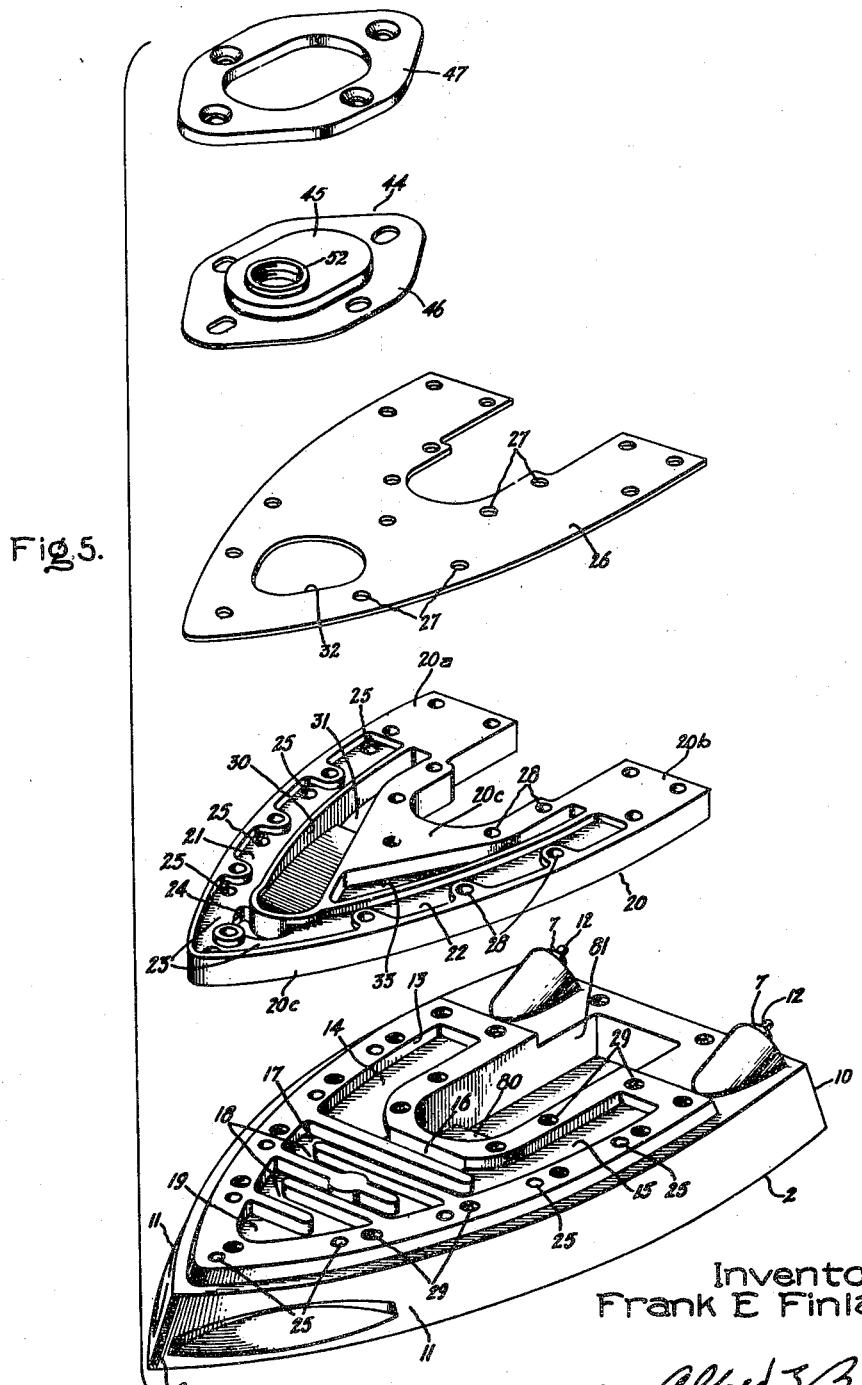

2,499,184

UNITED STATES PATENT OFFICE 2,499,184

STEAM GENERATING ELECTRIC PRESSING IRON

Frank E. Finlayson, Ontario, Calif., assignor to General Electric Company, a corporation of New York Application September 11, 1946, Serial No. 696,297

14 Claims. (Cl. 38—77)

This invention relates to pressing irons, and it has for its object the provision of an improved pressing iron which is arranged so that it may be used as a conventional "dry" iron, and also to generate steam so that it may be used as a "steam" iron.

More particularly, this invention relates to such an iron having a water reservoir from which water is fed into a steam generating chamber, and it contemplates the provision of an iron of this character having an improved organization of parts; this improved organization includes, among other features, an improved soleplate structure having steam generating means and passage means for conducting the steam generated to the pressing surface; improved means for conducting water from the reservoir to the steam generating means and improved means for regulating the flow of water from the reservoir; and also means for equalizing the pressure between the reservoir and steam generating means and thereby insures a steady flow of water to the generating means.

For a more complete understanding of this invention, reference should be had to the accompanying drawings in which Fig. 1 is a central, longitudinal, vertical sectional view taken through an electrically heated flatiron embodying this invention; Fig. 2 is a plan view of a portion of the flatiron shown in Fig. 1, parts being broken away so as to illustrate certain details of construction; Fig. 3 is a sectional view taken through the line 3—3 of Fig. 2 and looking in the direction of the arrows; Fig. 4 is a sectional view taken through the line 4—4 of Fig. 1, and looking in the direction of the arrows; Fig. 5 is an expanded perspective view of various elements used in the iron of Figs. 1-4; and Fig. 6 is a fragmentary, central, sectional view taken through another embodiment of this invention.

Referring to the drawings, this invention has been shown in one form as applied to an electrically heated flatiron comprising an iron body 1. The iron body 1 in turn comprises a soleplate 2 which is formed of any suitable heat conducting material, such as aluminum, and which preferably will be cast from this material. Embedded in the soleplate 2 is a suitable electrical heating element 3, which preferably will be of the sheathed type; briefly, this heating element comprises a helical resistance conductor 4 mounted within an outer metallic sheath 5 and supported in spaced relation with reference to the sheath by an electrically insulating, heat conducting mass 6, such as highly compressed granulated magnesium oxide. The heating element 3, as shown more clearly in Fig. 2, is roughly in the shape of a hairpin with the extremities 7 of its two legs located at the rear of the iron, and its nexus or bight 8 at the forward end of the iron. The two legs of the heater between the bight 8 at the front and the ends 7 at the rear curve to conform with the curvature of the two sides of the soleplate. Here, it should be noted that the soleplate is of the usual form having a front pointed end 9, a slightly curved heel end 10, and a pair of curved sides 11 between them.

Projecting from the two ends 7 of the heating element are electrical supply terminals 12.

Formed within the upper surface of the soleplate 2 in the rear portion thereof is a U-shaped flash steam boiler or generating chamber 13, this chamber having its two legs 14 and 15 located at the sides of the iron, and its bight or nexus 16 located crosswise of the iron and pointing toward the forward end of the iron. As will be pointed out in greater detail hereinafter, water is introduced into the right-hand leg 14 where it is generated into steam which passes through the bight 16 to the left-hand leg 15. Preferably, the bight section 16 will be depressed so as to trap water particles which tend to pass into the leg 15 and wherein they are generated into steam. Should any of the water particles escape the trap they will move into the left-hand leg 15 where they will be generated into steam. It has been found that substantially all of the water introduced into the left-hand leg of the generating chamber is transferred into steam before leaving the generating chamber. Leading forwardly from the generating chamber is a tortuous steam conducting passageway 17 formed by a series of convolutions 18 extending crosswise of the iron, as clearly shown, and connecting the steam generating chamber with a chamber 19 located at the point of the iron.

The two legs 14 and 15 of the steam generating chamber 13, as more clearly shown in Fig. 2, lie in a plane above the sections of the heating element 3 which pass along the sides of the iron, whereby their bottom walls are in close relation to the heating element and are highly heated thereby. Because of this arrangement, it has been found that substantially all of the water which is delivered to the steam generating chamber is transferred into steam before it leaves it. In the event, however, that any water does pass this chamber it will be transformed into steam in the tortuous passageway 17 leading from the generating chamber. It will be observed that this tortuous passageway also lies in the plane of the generating chamber, and that substantial lengths of it, particularly at the bends of the convolutions, lie directly over the heat generating element, as shown in Fig. 2 so that not only does this passageway function to transform into steam any water particles which might escape the generating cavity, but it functions to superheat the steam.

A common metallic cover plate 20 (preferably formed of aluminum) is provided for the steam generating cavity 13 and for the tortuous passageway 17. This cover plate is roughly of U-shape, as shown most clearly in Fig. 5, having legs 20a and 20b covering the steam generating chamber, and a relatively wide nexus 20c which covers the tortuous passageway 17. The side edges of this plate follow the contours of the side edge of the soleplate, as shown. The plate 20 is provided in its top surface with a pair of diverging lateral channels 21 and 22 whose front ends 23 are joined together, and which extend backwardly along the sides of the soleplate so as to overlie the plane of chamber 13 and passage 17, and also the side sections of the heating element 3. The forward ends 23 are placed in communication with the forward end 19 of the tortuous channel 17 through a port 24 extending through the cover plate, whereby the superheated steam issuing from chamber 19 flows upwardly into the channel sections 21 and 22 and thence rearwardly through them where it is further heated, and from which the steam passes downwardly through spaced-apart openings 25 in the cover plate and soleplate to the pressing surface of the latter. These series of openings, it will be observed, extend throughout the full lengths of the chambers 21 and 22 and thereby serve to distribute steam to a relatively large area of the soleplate.

The cover plate 20 in turn is provided with a thin metallic top plate 26 which covers the channels 21 and 22. The cover 26, the cover plate 20 and the soleplate 2 are rigidly secured together in assembled relation by a series of screws 26a directed through registered openings 27 and 28 in the cover plates 26 and 20, respectively, and received in tapped holes 29 provided for them in the soleplate.

The cover plate 20 also is provided in its upper surface with a channel 30 which follows the lines of the right-hand channel 21 and which is immediately inside of it. This channel slopes downwardly from the front to the rear and at the rear it terminates in an opening 31 which lies directly above the right-hand leg 14 of the steam generating cavity 13. Except at its forward end the top of this channel is covered by the plate 26, but at this forward end the cover is provided with an aperture 32, whereby access may be had to the channel through the top of the plate. It is through this aperture that water is supplied to the soleplate, the water fed to the forward part of the channel 30 flowing down the inclined channel and through the opening 31 into the steam generating cavity.

In addition, the cover plate 20 is provided with a second channel 33 in its top surface which also inclines downwardly from its forward end to the rear; this channel, however, is immediately inside channel 22, and it follows its contour; and it also at its forward end opens up through the opening 32 in the top plate 26 and at its rear opens into the right-hand leg 15 of the steam generating cavity through an opening 34 (Fig. 2) in the cover plate 20 at the rear of this channel.

Water is delivered through the opening 32 to the forward end of channel 30 from a water reservoir 35. This reservoir is provided with a flat bottom wall 36 and with a dome-shaped top wall 37 which functions both to enclose the reservoir at the top and which is the outer shell cover of the iron. The two walls 36 and 37 will be secured together in any suitable fashion, as by means of brazing.

Mounted upon the shell or top reservoir wall 37 is a suitable handle 38 having a front standard 39 and a rear standard 40 joined together by a hand-grasping section 41, these members being formed from a suitable phenol condensation product. The rear handle standard 40 is provided with upper and lower seats 42 and 43 which function to support the iron in a substantially upright or up-ended position of rest in which position the iron is placed when it is desired to cease ironing, in a manner well understood by those skilled in the art.

The reservoir 35 is supported at its forward end by means of a cover plate 44 for opening 32, which cover plate is dished upwardly in its central area 45, as most clearly shown in Figs. 1 and 5, so as to leave a flange section 46 therearound, and which section is rigidly clamped to the top plate 26 by means of a clamping ring 47; this ring is fitted to the flange 46 and secured by means of screw fastening means 48 to the cover plates 26 and 20. Preferably, this cover plate will be made of a metal having a relatively poor heat conductivity, such as stainless steel.

The reservoir is secured to the plate 44 directly by means of a regulating valve structure which functions to regulate the flow of water from the reservoir to the feed chute 30. This valve structure comprises a plug-like cylindrical valve body 49 (Figs. 1 and 4) which has a reduced lower end section that is directed through an opening 50 provided for it in the forward portion of the bottom wall 36 of the reservoir and which passes through an opening provided for it in the upraised section 45 of the cover plate 44. Positioned below the lower surface of this upraised portion is a nut 51 which has an extension 52 (Fig. 5) extending upwardly through the opening in the cover plate, and which nut is rigidly secured to the plate in any suitable way as by brazing. The lower reduced extension of the valve body is threaded into this nut so as to rigidly clamp the reservoir to the cover 44. Preferably and as shown, a gasket 52a will be inserted between the reservoir and the cover.

The upper end of the valve body is provided with a tubular reduced section 53, and around this reduced section is mounted an upright tube 54 which extends upwardly through the reservoir and through an opening 55 provided in its top. The lower end of this tube is in water-sealed relation with the valve body; this may be accomplished by brazing the tube to the body. The valve body 49, as most clearly shown in Fig. 4, is provided with a diametrical passageway 56 located below the tube 54 and above the bottom wall 36 of the reservoir, as shown. This diametrical passageway communicates with a central passageway 57 extending vertically through the valve body and terminating at its lower end in a valve seat 58. This seat is regulated by a needle valve 59 which is formed on the lower end of an adjustment rod 60 which rod has a threaded section 61 received in a complementary threaded section 62 provided for it on the valve body reduced section 53 as shown. It will be observed in view of this construction that water in the reservoir may flow into both ends of the transverse passageway 56 and thence downwardly through the vertical passageway 57 and port 58 if the needle valve is open. On the contrary, if the needle valve is closed no water can flow from the reservoir. It will be observed that the upper end of the tubular reduced section 53 is above the maximum water level in the reservoir, whereby water can never flow up the interior of this section about the threaded section 61 of the valve rod, and thence down into the steam generating chamber.

The top wall 37 of the reservoir is provided intermediate its ends with a fill opening 63 which is closed by a screw cap 64. Around this opening and depending therefrom is a circular wall 65 extending down into the reservoir and which prevents a complete filling of the reservoir. In other words, the reservoir may be filled only to the level of the lower end of the circular wall 65. The remainder of the reservoir being filled with air. The volume of air space above the water level is such that when the iron is up-ended to its position of rest on the seats 42 and 43, the highest water level in the reservoir will fall below the discharge port 58 of the valve structure and the top end of tube 54, whereby when the operator stands the iron in its upright position the flow of water is stopped automatically.

As pointed out previously, the upright tube 54 projects upwardly through the opening 55 provided for it in the top wall of the reservoir. Mounted in this opening 55 is a larger tube 66 which at its lower end is secured to the reservoir and which projects upwardly into a circular bore 67 provided for it in the front standard 39 of the handle.

Also, the adjusting rod 60 for the needle valve 59 extends upwardly through the tubes 54 and 66, as shown, and thence on upwardly through an opening 68 provided for it in the top part of the handle to the exterior of the handle. The upper end of the tube 66 is closed by a plug 69 threaded into it, as shown. This plug carries a fluid-tight seal packing 70 for the shaft 60. The forward part of the handle is secured to this plug 69 by means of a bushing 71 directed through the handle opening 68 and threaded in the plug 69, as shown, and which bushing receives the upper part of the valve shaft 60. This handle section is supported so that its lower end is spaced above the reservoir to thermally insulate it from the reservoir. The rear handle standard 40 also is spaced from the reservoir for the same purpose.

Mounted on the upper end of the valve shaft 60 is an adjustment knob 72 which preferably will be located in a circular recess 73 provided for it in the upper part of the handle, as shown, and from which the top part of the knob projects.

At the rear, the top wall 37 of the reservoir is secured to the heel end 10 of the soleplate by means of a suitable bracket 74.

The heating element 3 is automatically controlled responsively to the temperature of the soleplate by means of a suitable thermostatically-operated switch 75 which preferably and as shown will be the temperature responsive control device described and claimed in the United States patent to H. R. Batchelor No. 2,288,384, dated June 30, 1942. Briefly, this thermostat comprises a switch 76 which is connected in series in circuit with the heating element 3 and which is operated by a bimetallic thermostatic bar 77. The bar 77 is secured at one end to a clamping plate 78 which is clamped directly to the soleplate by means of screws 79. The plate 78 preferably is clamped to a seat 80 provided for it in the soleplate in a depression or recess 81 formed in the soleplate between the two legs of the steam generating chamber, as clearly shown. In other words, the thermal responsive element is located in the relatively deep cavity 81 in the space embraced by the steam generating cavity. This is an important feature in that the thermostat is located so close to the steam generating cavity that when the colder water is supplied to it, this portion of the iron becomes chilled at once and the cooling of the iron is immediately felt by the thermostat which thereupon functions to apply heat to restore the soleplate temperature. In other words, a supply of cold water into the steam generating cavity will quickly bring the thermostat into operation.

The adjustment shaft 82 for the thermostat is directed upwardly through a tube 83 provided for it between the bottom and top walls 36 and 37 of the reservoir, and to the top end of this shaft there is connected an adjustment knob 84 which is located outside of the top wall 37.

Another feature of this invention is the provision of improved and simple means for establishing a balance in pressure between the steam generating chamber 13 and the top part of the reservoir, whereby the flow of water from the reservoir to the steam generating chamber is independent of any pressure in the steam generating chamber, or any back pressure created in the steam generating chamber, and the steam delivery passage 17, 21 and 22, and the ports 25. This feature is very important because if this pressure were not equalized, any back pressure created in the steam generator and connected passage 30 due to the fabric or by any other medium offering resistance to the flow of steam through the ports 25 would materially retard the flow of water from the reservoir to the generator. However, when this pressure is equalized, it is clear that the water is independent of it. This equalization of pressure is accomplished by means of a series of vertical permanently open ports or passageways 85 (Figs. 1 and 4) directed through the valve body 49 and functioning to connect the space within the cover 44 with the space in the tube 54 above the valve body. Inasmuch as this tube 54 communicates at the top with the tube 66, and this tube in turn at its lower end communicates with the top part of the reservoir, it is evident that the pressure in the space above the water level in the reservoir will be equal to that within the cover 44. Since the space within the cover 44 communicates through the opening 32 in the top plate 26 with the channel 33 in the cover plate 20, and since this channel at its rear end communicates with the steam generating cavity leg 15 through the opening 34, then it is evident that the space above the water level in the reservoir has the same pressure as does the steam generating cavity 13. Likewise channel 31 affords communication between the generating cavity and the space within the cover 44.

The location of the generating cavity back from the nose of the iron and directly over the heater element legs is important because it is back there that the heating element has the greater heat concentration. Consequently, when relatively cold water is dropped into the cavity, there is much less likelihood that a chilled spot will develop in the soleplate, than is the case when the generator is located at the point or nose of the iron where there is relatively much less heat available to convert the incoming water into steam.

Also, the positioning of the thermostat immediately back of the generating chamber is important because it will respond at once to the cooling of the plate by the incoming water and apply heat to the soleplate, if needed, to maintain the soleplate temperature.

In the operation of this iron, it will be understood that the reservoir 35 will be filled with water through the opening 63 to the extent permitted by the circular wall 65. Then when the iron is "plugged in" and heated to the desired ironing temperature, the knob 72 will be rotated to adjust the needle valve 59 to establish the desired rate of water delivery to the supply chute 30. The water fed to this chute will flow down through it and the opening 31 into the right-hand leg 14 of the steam generating chamber 13. The water fed there will be flashed into steam, or at least the major portion of it will be. Some of it, however, will flow into the nexus 16 where its flow will be retarded so that it will be further heated and transformed into steam. Should any of the water globules tend to flow out of this trap they will reach the left-hand generating leg 15 where it is almost certain that all of the water particles will be converted into steam. The steam will flow forwardly through the tortuous passageway 17 to the forward end 19 thereof and in which passage it will be super heated. The steam from the chamber 19 will flow upwardly through the opening 24 to the joined end 23 of the two legs 21 and 22 of the top plate and thence will flow backwardly through these channels 21 and 22 for delivery to the vertical ports 25.

As pointed out previously, the pressure existing in the steam generating cavity 13 will be applied to the water level in the reservoir. And as pointed out previously, this provides for the flow of water from the reservoir which is totally independent of any back pressure created in the steam feed system.

When the iron is placed upright in its rest position on the seats 42 and 43 the water level in the reservoir falls below the level of the discharge port 58 and hence automatically cuts off the feed of water to the steam generating system, and hence automatically cuts off the generation of steam.

The iron may be used as a "dry" iron simply by closing the needle valve 59 to shut off the water flow, and operating the iron as a dry iron.

In Fig. 6, there is illustrated a modified form of this invention. Here, the iron comprises a soleplate 86 heated by a heating element 87, and provided with a steam generating chamber 88 and tortuous passageway 89, all arranged in substantially the same fashion as the corresponding parts of the first embodiment described. Here, however, the steam passes directly downwardly to the pressing surface through the discharge ports 90 located at the forward part of the tortuous passage 89. Here, also the tortuous passage and steam generating chamber are provided with a cover plate 91. And here also water is fed from a suitable reservoir 92 through a valve structure 93 all arranged as in the first form. And here also the reservoir is supported at the front and by means of a cover plate 94. Here, however, instead of causing the water discharged from the valve structure 93 to flow along a passageway which is an integral part of the cover plate 91, it flows down a separate relatively thin metallic chute 95 located within the cover plate 94, as shown. This chute, at its upper left-hand end, as viewed in Fig. 6 is secured to the valve structure holding nut 96 and inclines downwardly and rearwardly so that its discharge end empties into the passageway 88.

This embodiment operates in the same fashion as does the first described.

While I have shown and described particular embodiments of my invention, it will be obvious to those skilled in the art that various changes and modifications may be made without departing from my invention in its broader aspects and I therefore aim in the appended claims to cover all such changes and modifications as fall within the true spirit and scope of my invention.

What I claim as new and desire to secure by Letters Patent of the United States is:

1. A steam iron comprising an iron body having an operative ironing position, and said body having a heel rest upon which the body may rest in an inoperative position wherein the forward end of the iron is up-ended, said body also being provided with a soleplate having a pressing surface and with a steam generating cavity intermediate its ends and also with a tortuous steam passage leading forward from said cavity to a point adjacent the front end of said soleplate, means for heating said soleplate, a water reservoir on said soleplate having a valve controlled port for controlling the flow of water from said reservoir located adjacent the forward end of said iron so that when said iron is in said inoperative position said port is located above the water level in said reservoir, a water conduit for conveying water discharged through said port back to said steam generating cavity, and steam passage means for conducting steam from the forward end of said tortuous passage out through said pressing surface.

2. A steam iron comprising a body provided with a soleplate having a pressing surface and also having a front end and a heel end, the body having an operative ironing position and an inoperative position of rest wherein said front end is upraised on said heel end, a water reservoir on said soleplate having a valve controlled discharge port at said front end for regulating the discharge of water from said reservoir and when said iron is in said position of rest said port is located above the level of the water in said reservoir, a heating element for said soleplate having a pair of sections extending along the sides of said soleplate, a U-shaped cavity in said soleplate at a point substantially removed from the front of said soleplate and having its legs adjacent said sections respectively of said heating element, a chute extending rearwardly from said port to one of said legs conveying water from the port back to said cavity, and conduit means for conveying steam from said cavity to said pressing surface.

3. A steam iron comprising a body provided with a soleplate having a pressing surface and also having a front end and a heel end, a water reservoir on said soleplate having a valve controlled discharge port at said front end for regulating the discharge of water from said reservoir, a heating element for said soleplate having a pair of sections extending along the sides of said soleplate, a U-shaped cavity at the rear portion of said soleplate having its legs adjacent said sections respectively of said heating element, conduit means for conveying steam from said cavity to said pressing surface including a section leading from said cavity and extending back and forth crosswise of said soleplate, and a water conduit leading from said port back to one of the legs of said cavity for conveying the water discharged from the reservoir to said cavity.

4. A steam iron comprising a body provided with a soleplate having a pressing surface and also having a front end and a heel end, a water reservoir on said soleplate having a valve controlled discharge port at said front end for regulating the discharge of water from said reservoir, a heating element for said soleplate having a pair of sections extending along the sides of said soleplate, a U-shaped cavity intermediate the ends of said soleplate and having its legs adjacent said sections respectively of said heating element, a forwardly extending channel leading from said cavity and having a series of connected sections extending crosswise of said soleplate and terminating at the front, a cover plate for said cavity and channel, said cover plate having a pair of diverging closed channel joined at the front and extending back rearwardly along the lines of said heating sections, means connecting the joined front ends of said channels with the front end of said first-named channel, spaced ports through said cover and soleplate connecting said diverging channels with said pressing surface, and said plate having in its top surface a channel between said diverging channels open to said port and extending therefrom back to said cavity to carry the water discharged from said port to said cavity.

5. A steam iron comprising a body provided with a soleplate having a pressing surface and also having a front end and a heel end, a water reservoir on said soleplate having a valve controlled discharge port for regulating the discharge of water from said reservoir, said soleplate being formed with a steam generating cavity in its upper surface intermediate its ends and at a point removed from said port, heating means for said soleplate and cavity, and said plate having formed therein a channel in its upper surface directed longitudinally from said cavity and with port means connecting the channel with said pressing surface, a common cover plate for said cavity and channel, and said cover plate having formed in its upper surface a channel open to receive water from said port and connected with said cavity to discharge it therein.

6. A steam iron comprising a body provided with a soleplate having a pressing surface and also having a front end and a heel end, the body having an operative ironing position and an inoperative position of rest wherein said front end is upraised on said heel end, a water reservoir on said soleplate having a valve controlled discharge port at said front end for regulating the discharge of water from said reservoir and when said iron is in said position of rest said port is located above the level of the water in said reservoir, said soleplate being formed with a steam generating cavity in its upper surface intermediate its ends, heating means for said soleplate and cavity, and said plate also having formed therein a channel in its upper surface directed longitudinally from said cavity and with passage means connecting it with said pressing surface, a common cover plate for said cavity and channel, and a water conduit extending from said port back to said cavity for delivering water discharged from the port into the cavity.

7. A steam iron comprising a body provided with a soleplate having a pressing surface and also having a front end and a heel end, the body having an operative ironing position and an inoperative position of rest wherein said front end is upraised on said heel end, a water reservoir on said soleplate having a valve controlled discharged port at said front end for regulating the discharge of water from said reservoir and when said iron is in said position of rest said port is located above the level of the water in said reservoir, said soleplate being formed with a steam generating cavity in its upper surface intermediate its ends back of said port, heating means for said soleplate and cavity, conduit means for conveying steam generated in said cavity to said pressing surface, and a water conduit extending from said port back to said cavity for delivering water discharged from the port to the cavity.

8. A steam iron comprising a body provided with a soleplate having a pressing surface and also having a front end and a heel end, the body having an operative ironing position and an inoperative position of rest wherein said front end is upraised on said heel end, a water reservoir on said soleplate having a valve controlled discharge port at said front end for regulating the discharge of water from said reservoir and when said iron is in said position of rest said port is located above the level of the water in said reservoir, a heating element for said soleplate having a pair of sections extending along the sides of said soleplate and united at the front by a front section, said soleplate having walls defining a steam generating cavity substantially removed toward the rear from said front section and located adjacent said sections at the sides and the forward wall of which is located a substantial distance toward the rear of said soleplate from said front section, passage means connecting said cavity with said pressing surface, and a water conduit extending back from said port to said cavity for delivering water discharged from said port to the cavity.

9. A steam iron comprising a body provided with a soleplate having a pressing surface and also having a front end and a heel end, the body having an operative ironing position and an inoperative position of rest wherein said front end is upraised on said heel end, a water reservoir on said soleplate having a valve controlled discharge port at said front end for regulating the discharge of water from said reservoir and when said iron is in said position of rest said port is located above the level of the water in said reservoir, a heating element for said soleplate having a pair of sections extending along the sides of said soleplate, a U-shaped cavity at the rear portion of said soleplate having its legs adjacent said sections respectively of said heating element, a forwardly extending channel leading from said cavity and having a series of connected sections extending crosswise of said soleplate and terminating at the front, a cover plate for said cavity and channel, said cover plate having a pair of diverging closed channels joined at the front and extending back rearwardly along the lines of said heating sections, means connecting the joined front ends of said channels with the front end of said first-named channel, spaced ports through said cover and soleplate connecting said diverging channels with said pressing surface, said cover plate having in its top surface a channel between said diverging channels open at one end to said port, and extending back therefrom to said cavity to carry the water discharged from said port to said cavity, and said plate also having an additional channel between said diverging channels connected at one end with said cavity and conduit means connecting its other end with the top part of said reservoir above the water level therein.

10. A steam iron comprising a soleplate, a steam generator on said soleplate, means for heating said steam generator and soleplate, a water reservoir overlying said soleplate having forward and rear walls and a bottom wall and also having a valve controlled discharge port in said bottom wall between said forward and rear walls for discharging water from the reservoir downwardly toward said soleplate, said port being spaced longitudinally of said plate away from said generator, and a conduit leading from said port to said cavity for conveying water discharged from said port to the cavity.

11. A steam iron comprising a soleplate, a steam generator on said soleplate, means for heating said soleplate and generator, a water reservoir overlying said soleplate and generator, and a valve structure providing communication between said reservoir and said generator, said valve structure including a port permitting water flow from said reservoir to said generator, a valve controlling said port, and separate permanently open passage means communicating between said generator and the interior of said reservoir above the water level through a conduit forming part of said valve structure and extending upwardly in said reservoir.

12. A steam iron comprising a soleplate, a steam generator on said soleplate, means for heating said soleplate and generator, a water reservoir overlying said soleplate and generator, and a valve structure providing communication between said reservoir and said generator, said valve structure including a valve seat member having a port therein through which water flows from said reservoir to said generator, a valve for closing said port and adjustable to regulate the flow of water to it from said reservoir, a tube rising up through said reservoir from said seat member liquid sealed at the bottom to said seat member and the top of said tube communicating with the interior of said reservoir above the water level, an adjustable operating shaft for said valve extending up through said tube, and said seat member having a separate permanently open port connecting said generator with the interior of said tube.

13. A steam iron comprising a body provided with a soleplate having a pressing surface and also having a front end and a heel end, a heating element for said soleplate having a pair of sections extending along the sides thereof, a U-shaped cavity intermediate the ends of said soleplate having its bight toward the front end of said soleplate and its legs extending rearwardly therefrom adjacent said sections respectively of said heating element, a forwardly extending steam delivery channel leading from said cavity, a cover plate for said cavity and channel, said cover plate having a pair of diverging closed channels joined at the front and extending rearwardly along the lines of said heating sections substantially to the ends of said legs of said cavity, means connecting the joined front ends of said diverging channel with the front end of said first-named channel, spaced ports through said cover and soleplate connecting said diverging channels with said pressing surface and means for supplying water to said cavity.

14. A steam iron comprising a body provided with a soleplate having a pressing surface and also having a front end and a heel end, a water reservoir on said soleplate having a valve controlled discharge port for regulating the discharge of water from said reservoir, a heating element for said soleplate having a pair of sections extending along the sides thereof, a U-shaped cavity in said soleplate spaced as a whole lengthwise of said soleplate from said port and having its legs adjacent said sections respectively of said heating element, a forwardly extending channel leading from said cavity, a cover plate for said cavity and channel, said cover plate having a pair of diverging closed channels joined at the front and extending back rearwardly along the lines of said heating sections, means connecting the joined front ends of said channels with the front end of said first-named channel, spaced ports through said cover and soleplate connecting said diverging channels with said pressing surface, said cover plate having in its top surface a channel between said diverging channels extending lengthwise thereof between said port and cavity and open at one end to said port and at the other end to said cavity to carry the water discharged from said port to said cavity, and said plate also having an additional channel formed in its top surface extending lengthwise thereof between said diverging channels so as to connect at one end with said cavity and conduit means connecting its other end with the top part of said reservoir about the water level therein.

FRANK E. FINLAYSON.

REFERENCES CITED

The following references are of record in the file of this patent:

UNITED STATES PATENTS

| Number | Name | Date |
|---|---|---|
| 1,843,568 | Ledbetter | Feb. 2, 1932 |
| 1,962,940 | Schatefer | June 12, 1934 |
| 1,969,583 | Skolnik | Aug. 7, 1934 |
| 2,237,381 | Wallace | Apr. 8, 1941 |
| 2,322,593 | Riddington et al. | June 22, 1943 |
| 2,353,604 | Waring et al. | July 11, 1944 |
| 2,384,839 | Kistner | Sept. 18, 1945 |
| 2,387,281 | Morton | Oct. 23, 1945 |
| 2,425,598 | Clum | Aug. 12, 1947 |

FOREIGN PATENTS

| Number | Country | Date |
|---|---|---|
| 369,269 | Canada | Oct. 12, 1937 |